United States Patent [19]
Lee

[11] Patent Number: 5,461,945
[45] Date of Patent: Oct. 31, 1995

[54] TIRE PUNCTURE REPAIR DEVICE

[76] Inventor: Meng-Chang Lee, Suite 1, 11F. No. 95-8 Chang Ping Rd. Sec. 1, Taichung, Taiwan

[21] Appl. No.: 238,328

[22] Filed: May 5, 1994

[51] Int. Cl.[6] .................................................. B29C 73/08
[52] U.S. Cl. ........................................................ 81/15.7
[58] Field of Search .................................. 81/15.2, 15.7

[56] References Cited

U.S. PATENT DOCUMENTS

| | | | |
|---|---|---|---|
| 743,963 | 11/1903 | Weigele | 81/15.7 |
| 1,594,031 | 7/1926 | Young | 81/15.7 |
| 3,837,243 | 9/1974 | Mays | 81/15.7 |
| 4,205,565 | 6/1980 | Smith | 81/15.7 |

*Primary Examiner*—James G. Smith
*Attorney, Agent, or Firm*—Beveridge, DeGrandi, Weilacher & Young

[57] ABSTRACT

A tire puncture repair device comprising a handle, an attached shank member, a conical threaded penetrater member, and a bolt/cover assembly. An elongate resilient obturater strip is threaded through an eyelet on the bottom of the penetrater member, folded lengthwise thereabout and inserted into the bore of the shank member. The ends of the inserted obturater strip are secured to respective anchor plates on a medial portion of the shank member, and the bolt/cover assembly secured thereover. The shank member is then inserted through a tire puncture with the threaded penetrater member boring therethrough. Afterwhich, a sliding bolt member is displaced forward within the shank member so as to push the penetrater member away from the end thereof and into the interior of the tire, carrying a bight of obturator strip therewith. The shank member is then extracted from the tire wall wherein the obturater strip remains lodged therein to seal the puncture.

5 Claims, 5 Drawing Sheets

TIRE PUNCTURE REPAIR DEVICE

BACKGROUND OF THE INVENTION

The present invention relates to a tire puncture repair device, and more particularly to a portable and manually operated tire puncture repair device which inserts a resilient obturating member through a tire puncture.

Conventional tire puncture techniques generally involve an resilient sealing member which is grasped on the end of a sharp implement which is subsequently impaled through a puncture aperture on a tire using considerable strength wherein the sealing member is partially carried therethrough. The implement is usually provided with a slit or other aperture whereby the sealing member is retained within the tire by the large compressive and blocking forces provided thereby when the implement is extracted from the tire. Though functional, the more conventional tire puncture techniques are generally cumbersome requiring a relatively large degree of physical exertion. Further, the large insertion forces often require that the tire be pre-inflated or the associated wheel removed from the vehicle.

The tire repair device of the present invention provides a much more efficient tool which requires relatively low insertion forces and which can be operated by unskilled personnel without undue manipulations.

SUMMARY OF THE PRESENT INVENTION

The tire puncture repair device of the present invention generally comprises a handle with an attached shank member having a bore in the free end thereof, a conical threaded penetrater member attachable to the free end of the shank member for rotation therewith, and a sliding bolt in the shank member for displacing the penetrater member away from the end thereof. An elongate resilient obturater member is threaded through an eyelet on the bottom of the penetrater member, folded lengthwise thereabout, and subsequently inserted into the bore of the shank member. The penetrater member is rotatingly bored through a tire puncture and after which displaced away from the fore end of the shank member carrying a bight of the obturater member therewith. The shank member can then be extracted from the tire wall leaving the penetrater member in place therein.

The tire puncture repair device of the present invention has as a main object to provide a device as characterized which requires much reduced user exertion and which facilitates tire repair by non professionals.

A further object of the present invention is to provide a tire puncture repair device providing a more efficient and reliable seal.

For a more thorough understanding of the present invention reference should be made to a detailed description of a preferred embodiment thereof, provided below along with accompanying drawings.

DETAILED DESCRIPTION OF THE PREFERRED EMBODIMENT

Figure 1:
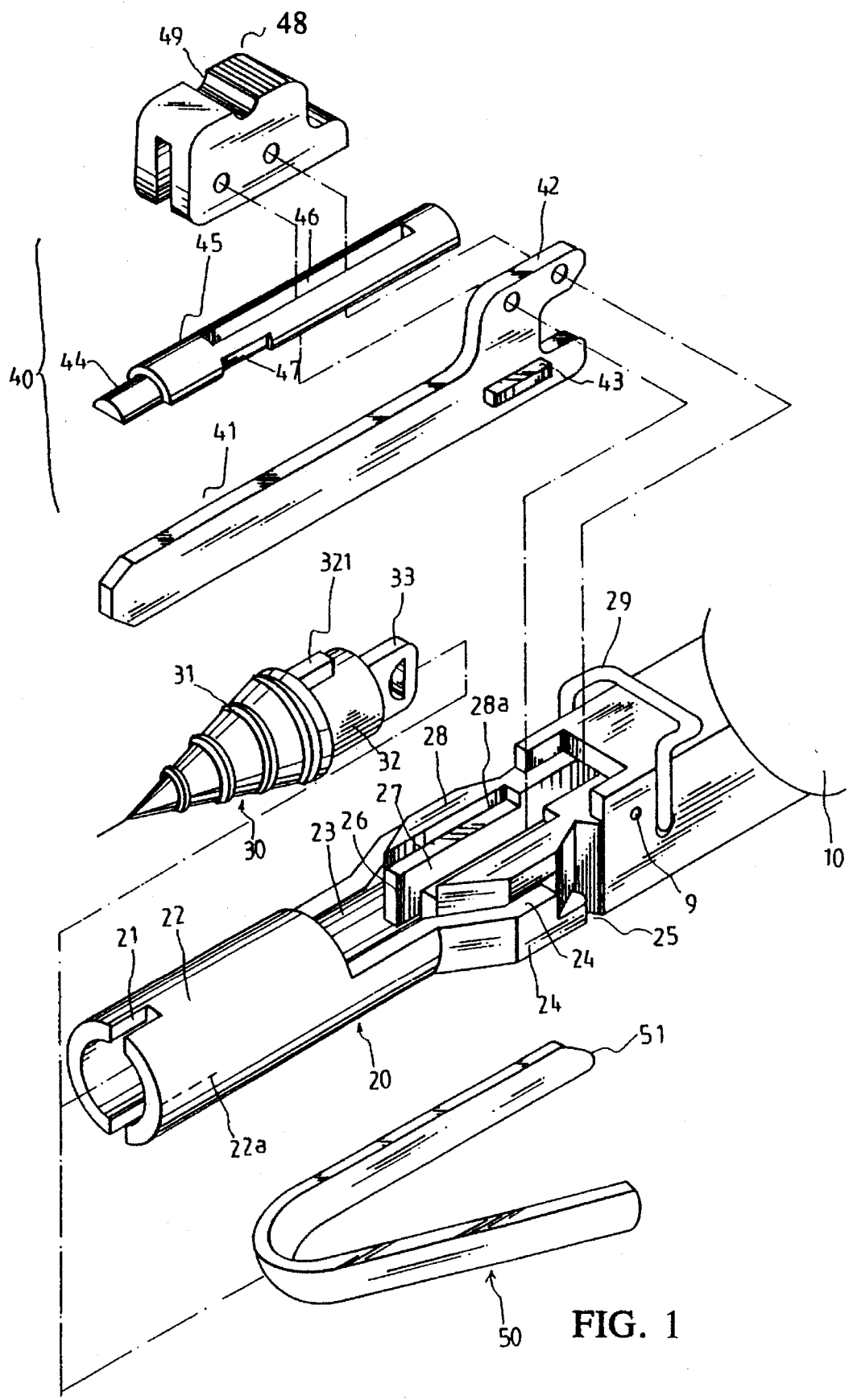
FIG. 1 is an exploded view of the tire repair device of the present invention.

Referring to FIG. 1 of the drawings, the tire puncture repair device of the present invention comprises a shank member 20 attached on a rear end to a handle 10 adapted for torque application, a generally conical penetrater 30 attachable to the fore end of the shank member, and a combined bolt/cover assembly 40.

The conical penetrater 30 has a helical cutting thread 31 formed therearound for boring through a tire puncture. At the bottom of the penetrater is a cylindrical plug 32 having a pair of axially aligned radial protrusions 321 thereon. An eyelet lug 33 having a semicircular aperture is fixed to the circular bottom of the plug 32.

Figures 3, 3A:
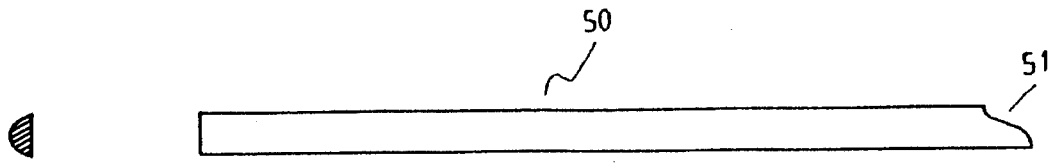
FIG. 3 shows an obturating member used by the tire repair device in a side view.
FIG. 3A is a sectional view of the obturating member of FIG. 3.

The repair device is used in conjunction with an elongate obturater strip 50 of a resilient material such as natural rubber or suitable synthetic. As shown in FIGS. 3 and 3A, the obturater strip 50 has a generally semicircular section taken along a near diametrical chord, with one end 51 thereof having a tapering termination.

During implementation the obturater strip 50 is inserted tapered end first through the aperture of the eyelet lug 33 to a central position thereon and folded lengthwise about the eyelet. The folded member 50 which now assumes a nearly circular section is then inserted into a bore 22a in the fore end of shank member 20 which preferably has been pre-lubricated.

The fore end of the shank member 20 is of cylindrical form for optimal insertion through a tire wall, and has an opening 23 in communication with the bore 22a therein defined by an elongate cut out portion having the form of a cylindrical arc segment. The folded strip 50 extends through the area of the opening 23 after insertion through the bore 22a of the shank member 20 wherein the protrusions 321 slide into cooperating notches 21 formed around the periphery of the fore end of the shank member 20. The penetrater 30 is thus rotatingly coupled with the shank member 20 so as to turn therewith.

Figures 4, 4A:
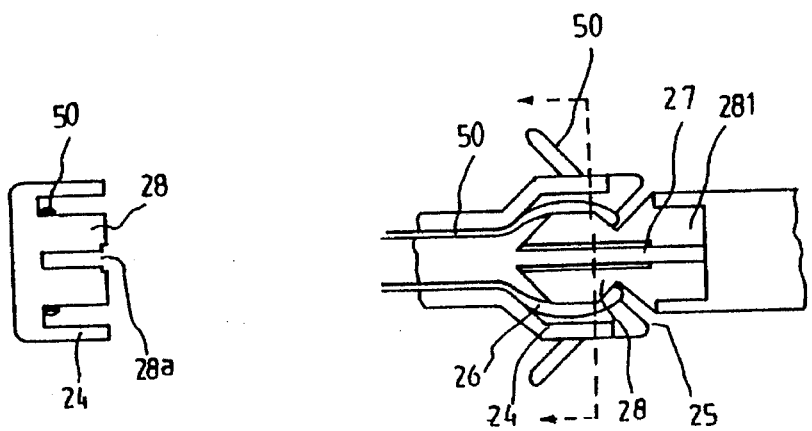
FIG. 4 is a plan view of a medial portion of the repair device with the obturating strip secured in place therein.
FIG. 4A is a view which illustrates the anchor plate 24 and block 28 of the shank member shown in FIG. 4.

Between handle 10 and the cylindrical fore end of shank member 20 is an adjoining medial portion having opposed laterally extending anchor plates 24 to which the ends of the folded obturater strip 50 can be releasably secured. Between the anchor plates 24 is a block 28 having a central recessed channel 27 axially aligned with the shank member 20. Narrow incised securing slots 25 extend inward from the rear periphery of each anchor plate 24. After insertion through the bore 22a and opening 23 of the shank member 20 the ends of an obturater strip 50 are manually extended under tension through respective guide ducts 26 defined between the periphery walls of the anchor plates 24 and the sides of block 28, and wedged in place within respective slots 25, as shown in FIGS. 4 and 4A.

Figure 2:
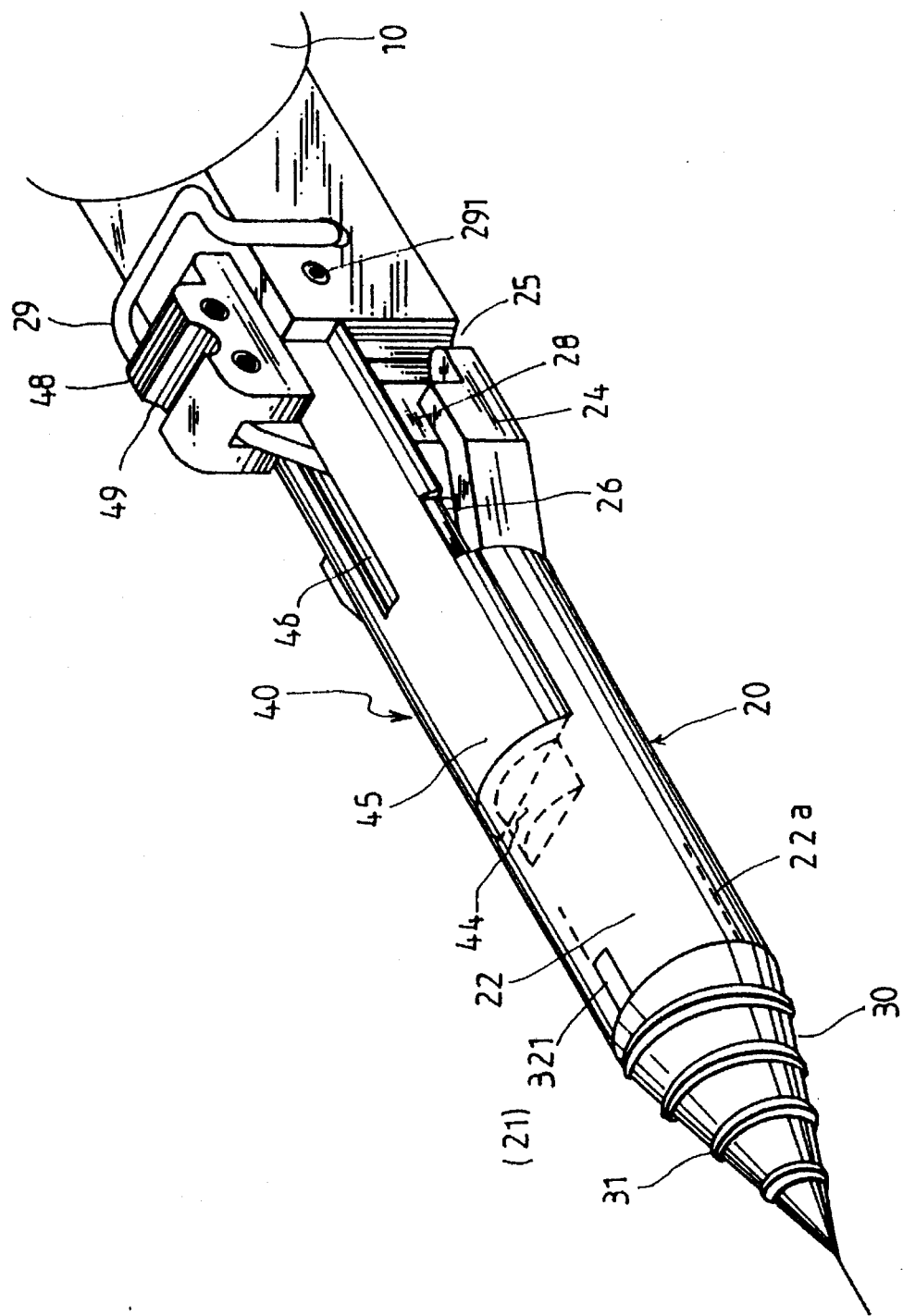
FIG. 2 is an assembled view of the repair device.
Figure 5:
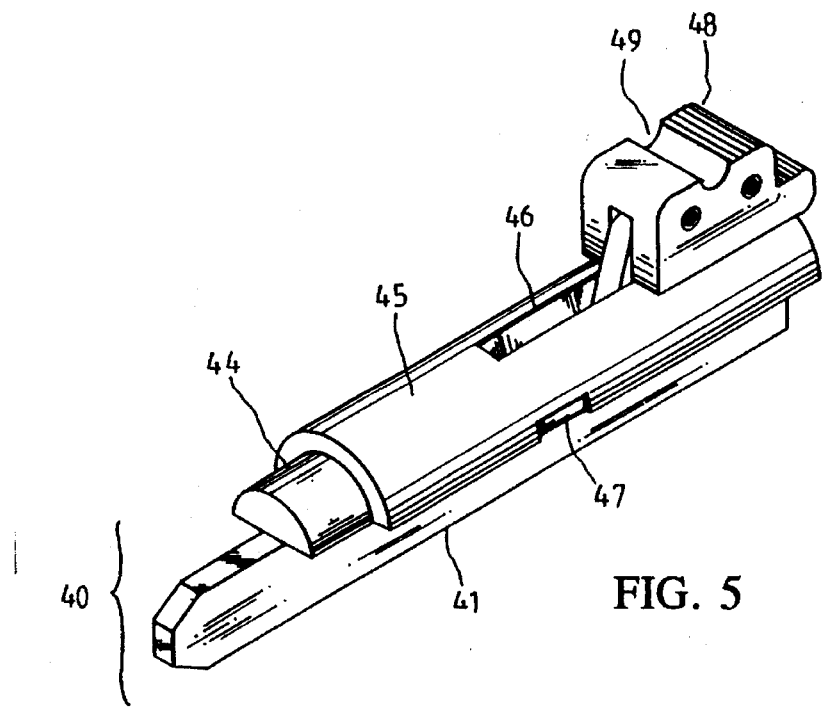
FIG. 5 shows an assembled bolt/cover assembly which is positioned over the medial portion of the tire repair device.

The bolt/cover assembly 40 comprises a bolt member 41 and an attached cover plate 45. The elongate bolt member 41 which is of predetermined length has a dorsal protruding lug 42 proximate a rear end thereof. The lug 42 extends through an axially aligned slot 46 of predetermined length on the cover plate 45. A top piece 48 is fixed over the lug 42 to secure the bolt member 41 to the cover plate 45, as shown in FIG. 5. A pair of lateral slats 43 at the base of the lug 42 are in abutment against the bottom of the cover plate 45. The bolt/cover assembly 40 is positioned on the medial portion of the shank member 20 by first placing a rear end portion of cover plate 45 into a recess 281 at the rear of block 28, and subsequently sliding the plate 42 forward until the forward end of the cover plate 42 is in abutment with the rim of opening 23. An arcuate member 44 protruding longitudinally from the forward end of plate 45 concomitantly inserts into bore 22a and is in abutment with the surrounding wall. Referring also to FIG. 2, plate 45 covers opening 23 and any obturater strip 50 therein, and is conformingly shaped such that the portion of shank member 20 forward plates 24 has a cylindrical form, facilitating insertion through a tire. Lateral notches 47 on either side of the cover plate 40 are in registry with ducts 26, providing openings of sufficient height for the passage of the end portions of the obturater strip 50. The rear of bolt member 41 is slidingly positioned within an axially aligned channel 27 in block 28 with a countersunk recess 28a accommodating slats 43, while the front portion thereof is positioned between folded halves of any obturater strip 50 disposed in the shank member 20. The bolt member 41 extends through bore 22a upon a forward displacement to a stop position defined by slot 46 on the cover plate 45. Initially, bolt member 41 is at a rear stop position within channel 27, whereat the bolt/cover assembly is releasably secured to the shank member 20 by rotating a hingedly connected hasp 29 disposed to the rear of recess 281 so as to engage a catch recess 49 on the top piece 48.

Figure 6:
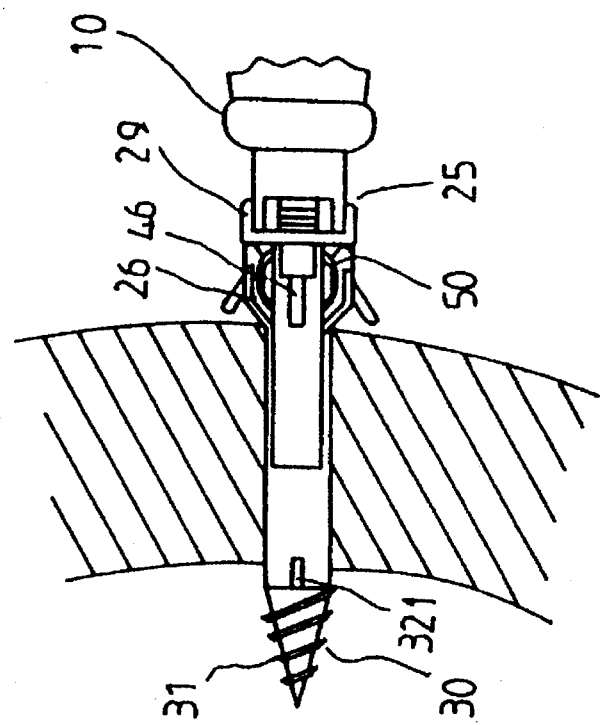
FIG. 6 shows the tire repair device after having bored through a puncture in a tire wall.
Figure 7:
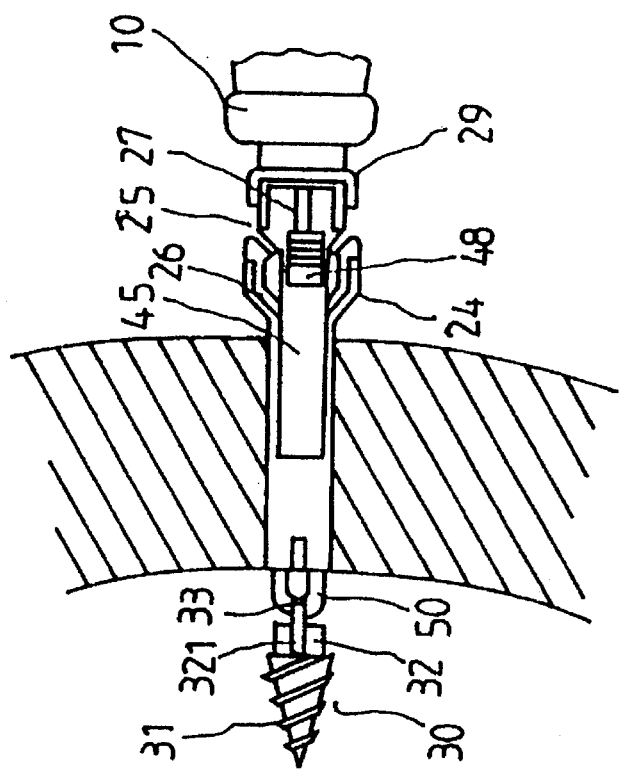
FIG. 7 shows a penetrater member of the tire repair device and an attached length of elastic strip displaced forward into the interior of the tire.
Figure 8:
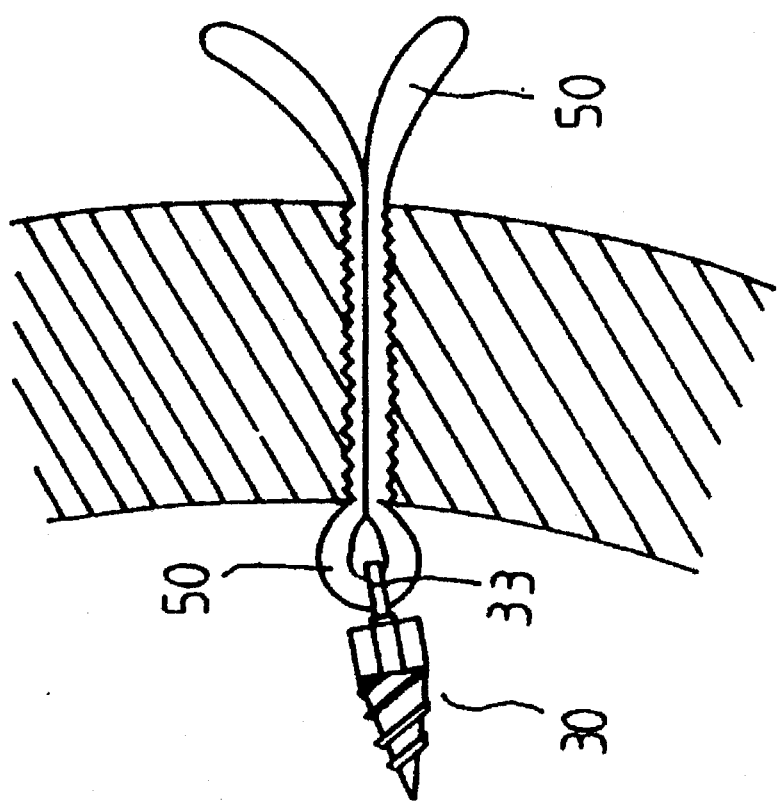
FIG. 8 shows the elastic strip in position obturating the tire puncture after extraction of the repair device.

In operation, an obturater strip 50 is inserted through the eyelet 33 of the penetrater member 30, folded in half and inserted into the bore in shank member 20, and secured to anchor plates 24 as aforedescribed. After the bolt/cover member assembly 40 is secured in place, the penetrater member 30 is directed into a puncture on a tire and rotated therethrough by turning the handle member 10. Preferably, the puncture should have been widened by augering with a suitable hand tool such as a square section awl, and lubricated so as to facilitate entry of the penetrater member 30 and the fore end portion of the shank member 20. FIG. 6 shows the tire puncture repair device after the penetrater member 30 has traversed the thickness of the tire. After traversing of the tire wall, the ends of the obturater strip 50 are released from the securing slots 25, and the hasp 29 disengaged from the top piece 48. The top piece 48 and bolt member 41 are then manually slid forward to the stop position, wherein the front end of the bolt member 41 abuts the eyelet 33 and displaces it forward away from the fore end of the shank member 20 by a predetermined distance, as shown in FIG. 7. The eyelet of the penetrater member 30 carries a bight of the obturater strip 50 out from the bore of the shank member 20. The fore end of the shank member 20 is subsequently extracted from the tire wall, preferably by a series of slow twists and pulls. The obturater strip 50 is grasped and retained by the tire wall due to the greater width of the bight of elastic strip and the compression of the tire wall thereon. As shown in FIG. 8, the penetrater member 30 remains within the tire and a substantial length of obturater strip 50 extends outside of the tire wall, which is subsequently cut off with a suitable hand tool. More conventional repair implements utilize a far thicker obturater strip which is harder and far more difficult to cut. Note that the rotating insertion of the penetrater member 30 through the tire substantially scores the sides of the puncture aperture due to the cutting threads thereon which aids in providing a reliable seal around the obturater strip 50. Also the presence of the attached penetrater head prevents any possible egress of the obturater strip 50 to the outside of the tire.

The foregoing description should not be construed in a limitative sense but rather as being exemplary of the concepts embodied by the present invention, with the actual spirit and scope thereof being determined by the appended claims and their legal equivalents.

I claim:

1. A tire puncture repair device for inserting a resilient elongate obturating member of predetermined length through a puncture in a tire, said tire puncture repair device comprising:

a handle member;

an elongate shank member fixed on a rear end thereof to said handle member, said shank member having a central bore in a cylindrical fore end portion thereof, and at least one axially aligned first coupling surface extending from the fore end thereof;

a generally conical penetrater member having a helical thread formed therearound for boring through a tire puncture, said penetrater member having an eyelet below a base thereof and at least one axially aligned second coupling surface for engagement with corresponding at least one axially aligned first coupling surface on said shank member, wherein said obturating member is inserted through the eyelet and folded thereabout, after which the folded said obturating member is inserted into the bore of said shank member until said penetrater member is brought into abutment with the fore end of said shank member with the second coupling surface thereon slidingly engaging the first coupling surface of said shank member to rotatingly couple said penetrater member therewith;

a securing means for releasably securing a portion of either end of the folded said obturating member to medial positions between the fore end of said shank member and said handle member after insertion of said obturating member into the bore of said shank member, whereat said obturating member is under tension and biases said penetrater member against the fore end of said shank member; and a bolt member engageable with said penetrater member through the bore of said shank member for urging said penetrater member away from the fore end of said shank member so as to have a predetermined separation therefrom after penetration of a wall of a tire, whereat the displaced said penetrater member carries a bight of said obturating member out from the bore of said shank member with a sufficient length of the folded said obturating member remaining in the bore, subsequent extraction of said shank member from the tire puncture after first disengaging said securing means concomitantly effects the extrusion of said obturating member from the bore of said shank member so as to obturate the tire puncture.

2. A tire puncture repair device as claimed in claim 1, wherein said securing means comprises an extraction opening on a medial portion of said shank member in communication with the bore thereof, and a pair of opposed laterally extending securing plates on the medial portion of said shank member disposed between the extraction opening and said handle member, each said securing plates having an incision on a peripheral edge theroef, wherein each end portion of a folded said obturating member disposed in the bore of said shank member extends through the extraction opening and is elastically extended towards said handle member and across respective said securing plates, and subsequently wedged in place within associated incisions in said securing plates to releasably secure the end portions of said obturating member.

3. A tire puncture repair device as claimed in claim 2, further including an elongate and axially aligned channel of predetermined length in said shank member disposed between said extraction opening and said handle member, and wherein said bolt member comprises an elongate slide element of predetermined length slidingly disposed in the channel and traveling between halves of the folded said obturating member when forwardly displaced into the bore of said shank member, and a protruding lug for facilitating manual manipulation adjoined with the slide element and extending away from said shank member a first end of said slide element abutting the eyelet of said penetrater member upon a forward displacement thereof.

4. A tire puncture repair device as claimed in claim 3, wherein the extraction opening on said shank member is defined by an elongate axially aligned cut out extending from the fore end portion of said shank member toward said handle member, and further comprising an elongate cover member releasably securable over the cut out so as to enclose the slide element and a substantial portion of said obturating member, said cover member having an axially aligned elongate slot of predetermined length thereon throughwhich the protruding lug of the slide element extends, acting as a stop for limiting forward displacement of said bolt member.

5. A tire puncture repair device as claimed in claim 4, wherein the at least one second coupling surface on said penetrater member comprises a radial protrusion on the periphery of the base thereof, and the at least one first coupling surface on the fore end of said shank member comprises a cooperating notch formed on the periphery thereof.

* * * * *